(12) United States Patent
Saoji et al.

(10) Patent No.: US 10,374,996 B2
(45) Date of Patent: Aug. 6, 2019

(54) INTELLIGENT PROCESSING AND CONTEXTUAL RETRIEVAL OF SHORT MESSAGE DATA

(71) Applicant: Microsoft Technology Licensing, LLC, Redmond, WA (US)

(72) Inventors: Govind Saoji, Hyderabad (IN); Vipindeep Vangala, Hyderabad (IN); Deepinder Gill, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 94 days.

(21) Appl. No.: 15/220,917

(22) Filed: Jul. 27, 2016

(65) Prior Publication Data
US 2018/0034755 A1    Feb. 1, 2018

(51) Int. Cl.
| | | |
|---|---|---|
| *H04W 4/12* | (2009.01) | |
| *G06F 17/21* | (2006.01) | |
| *G06Q 10/10* | (2012.01) | |
| *G06Q 30/02* | (2012.01) | |
| *H04L 12/58* | (2006.01) | |
| *H04L 29/06* | (2006.01) | |

(52) U.S. Cl.
CPC ............ *H04L 51/12* (2013.01); *G06F 17/21* (2013.01); *G06Q 10/107* (2013.01); *G06Q 30/02* (2013.01); *G06Q 30/0261* (2013.01); *G06Q 30/0267* (2013.01); *G06Q 30/0269* (2013.01); *H04L 51/22* (2013.01); *H04L 51/36* (2013.01); *H04L 63/126* (2013.01); *H04L 63/1416* (2013.01); *H04W 4/12* (2013.01)

(58) Field of Classification Search
CPC ....... G06Q 10/10; G06Q 10/107; H04L 51/02
See application file for complete search history.

(56) References Cited

U.S. PATENT DOCUMENTS

| | | |
|---|---|---|
| 8,380,697 B2 | 2/2013 | Benyamin et al. |
| 8,832,205 B2 | 9/2014 | Nelson et al. |
| 9,176,945 B1 | 11/2015 | Berner et al. |
| 9,232,373 B1 | 1/2016 | Caldwell et al. |
| 9,280,520 B2 | 3/2016 | Guenigault et al. |

(Continued)

OTHER PUBLICATIONS

"International Search Report and Written Opinion Issued in PCT Application No. PCT/US2017/042294", dated Aug. 31, 2017, 12 Pages.

(Continued)

*Primary Examiner* — Ranodhi Serrao

(57) ABSTRACT

In non-limiting examples of the present disclosure, systems, methods and devices for providing contextualized SMS data from one or more SMS messages to a client are presented. SMS data from SMS messages may be filtered and relevant information from the filtered SMS data may be extracted. The extracted information from the SMS data may be categorized into one or more contextual categories in a tiered contextual content hierarchy. The categorization of the SMS data may include analyzing world knowledge related to the extracted information and associating searchable context metadata with the categorized information. An indication to provide feedback related to the SMS data may be received and feedback related to the received SMS data may then be provided to the client.

20 Claims, 11 Drawing Sheets

(56) References Cited

U.S. PATENT DOCUMENTS

| | | | |
|---|---|---|---|
| 2006/0123083 A1* | 6/2006 | Goutte | G06Q 10/107 709/206 |
| 2009/0089352 A1* | 4/2009 | Davis | G06Q 10/00 709/201 |
| 2009/0307313 A1 | 12/2009 | Wang et al. | |
| 2010/0042470 A1 | 2/2010 | Chang et al. | |
| 2011/0320562 A1 | 12/2011 | Lane et al. | |
| 2012/0054135 A1 | 3/2012 | Salaka et al. | |
| 2013/0212190 A1 | 8/2013 | Patil | |
| 2015/0281920 A1 | 10/2015 | Dhanyamraju et al. | |
| 2016/0119268 A1 | 4/2016 | Sharp et al. | |
| 2016/0149849 A1 | 5/2016 | Lukacs et al. | |

OTHER PUBLICATIONS

Cooper, et al., "Extracting Information from Short Messages", In Proceedings of the 10th International Conference on Applications of Natural Language to Information Systems, Jun. 15, 2005, 4 pages.

\* cited by examiner

INTELLIGENT PROCESSING AND CONTEXTUAL RETRIEVAL OF SHORT MESSAGE DATA

BACKGROUND

Businesses have increasingly moved their marketing, advertising and other direct-to-consumer communications away from paper delivery and towards digital media communications. As an effect of this transition to electronic content delivery, the low cost of making electronic content delivery and the ease of delivering electronic content to large groups of individuals, there has been an increase in the number of spam messages and other malicious content that individuals receive on a daily basis.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Non-limiting examples of the present disclosure describe systems, methods and devices for providing contextualized short message service ("SMS") data from one or more SMS messages to a client. SMS data from a client may be received. The SMS data may be filtered with one or more filters. Relevant information from the filtered SMS data may be extracted. The extracted information may be categorized into one or more contextual categories in a tiered contextual content hierarchy, the categorizing comprising analyzing world knowledge related to the extracted information. Searchable context metadata may be associated with the categorized information. An indication to provide feedback related to the received SMS data may be received from the client and feedback related to the received SMS data may be provided to the client based on the associated context metadata.

BRIEF DESCRIPTION OF THE DRAWINGS

Non-limiting and non-exhaustive examples are described with reference to the following figures.

DETAILED DESCRIPTION

Figure 1:
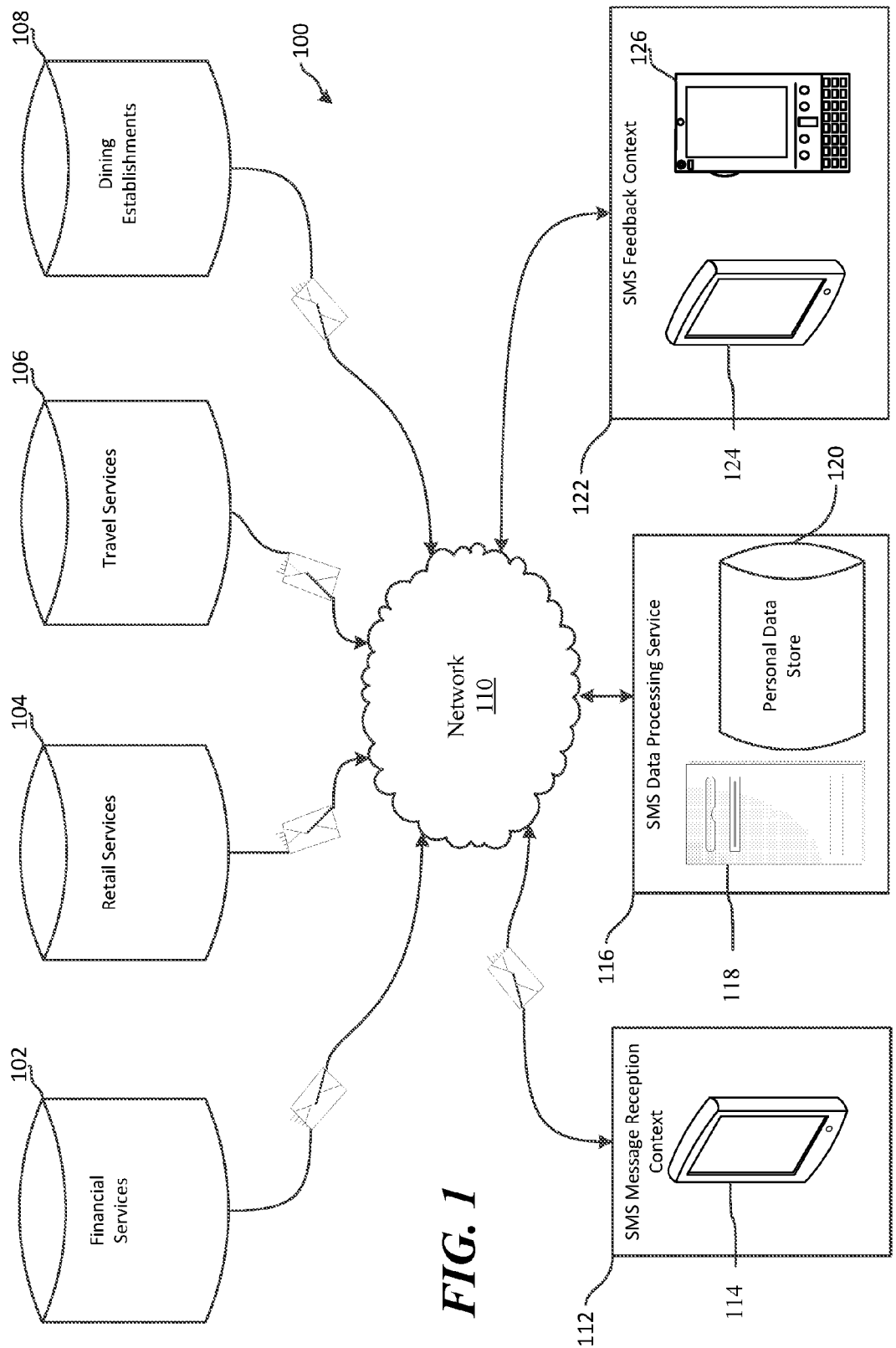
FIG. 1 is a schematic diagram illustrating an example distributed computing environment for providing contextualized SMS data from one or more SMS messages to a client.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The various embodiments and examples described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the claims.

Generally, the present disclosure is directed to extracting SMS messages from a client device (e.g., a smart phone, tablet computing device, smart watch, etc.), filtering those messages for spam, malicious content and other non-relevant information, categorizing the remaining SMS data using world knowledge to supplement the SMS data, and tagging the SMS data with searchable metadata such that SMS data feedback can be sent to a user in a proactive or reactive manner at an appropriate time to help with task completion.

According to examples, a user may receive SMS messages such as text messages, WhatsApp messages, Skype messages, or other short messages from friends, family, colleagues, restaurants, retail establishments, financial institutions, travel services and other entities. One or more of those messages may contain content and/or provide a link to content that would be helpful to a user in performing a task. Examples of such content include dates, times and locations (e.g., travel reservations, bus, train and plane tickets and purchase confirmations, event tickets and purchase confirmations, receipts (e.g., dining and retail receipts), bill reminders, bill due dates, bill payment confirmations, banking receipts, cell phone data plan use updates and phone minute plane utilization updates, and coupons, among others.

While the amount of useful content received via SMS messages is vast, there is also a large amount of content received in those messages that is irrelevant to task completion (e.g., spam messages, malicious messages, various personal conversations, etc.). Examples described herein relate to filtering irrelevant messaging information out, and categorizing and contextualizing relevant SMS content such that it can be provided to a user reactively (e.g., when a user provides the systems described herein with a query related to information received via SMS message) and proactively (e.g., when time, location or other indicators received from a user's client device indicate that SMS content is likely to be helpful in completing a task).

One or more standardized schema, such as those found on www.schema.org may be used to filter out irrelevant messaging information, as well as spam content and malicious content. As used herein, schema refers to a set of standardized formats for structured data on the Internet, on web pages, SMS messages and email messages, which can be used with many different encodings, including RDFa, Microdata and JSON-LD. These vocabularies, examples of which are available at the website schema.org, describe entities, relationships between entities and actions, and can easily be extended through a well-documented extension model.

Commonly used schemas provide standardized formats for identifying and parsing the entities and objects described thereby, including: creative works, embedded non-text objects, events, health and medical types, organizations, persons, places, local businesses, business type, products, offers, reviews, ratings and actions, among others.

Embodiments are related to filtering mechanisms that compare the format of data extracted from an SMS messages and determine whether they meet criteria specified in one or more known schema formats. If a determination is made that extracted data does not meet a known schema format the message containing that data may be filtered out completely or the SMS message may be tagged as "unknown" or with another property or object that denotes that the message does not contain a recognized schema format and it may be passed along for further processing for a determination of whether relevant information may nonetheless be included in the message.

In addition to using schemas for filtering SMS content, whitelists and blacklists may also be utilized. For example, a whitelist containing the names of one or more trusted senders or metadata associated with one or more trusted senders may be used to determine whether SMS data from an extracted message should be filtered out. Similarly, a blacklist containing the names of one or more known spam entities or metadata associated with one or more spam entities may be used to determine whether SMS data from an extracted message should be filtered out. Blacklists containing content that has been identified as spam or as likely being malicious (e.g., phishing schemes or other virus-related content) may also be created and dynamically updated such that they contain an up to date list of irrelevant and potentially harmful content that may be used to determine whether SMS data from an extracted message should be filtered out. These lists may also be supplemented with key words, phrases, metadata and language patterns that have been identified as likely being associated with spam or malicious content.

In addition to filtering out SMS messaging content after it has been extracted by the systems described herein, a user may configure one or more of their computing devices or an account associated one or more of those devices such that SMS messages and certain information included in those messages is filtered prior to being extracted by the systems described herein. For example, a user may access a settings feature related to a personal user account such as a cloud based account and modify privacy settings that relate to the type of content that can be accessed by one or more cloud-based services. Examples of information that a user may prevent cloud-based services from accessing may include information such as passwords, pin numbers, salary information, social security numbers, age, gender, date of birth, location, web browsing history, application use history, and other personal information that a user may wish to keep confidential. In addition to providing a means for personalizing data security, this feature may also be used to minimize the volume of data that is processed and stored by the SMS data processing systems described herein.

The systems and methods described herein may utilize a variety of mechanisms for determining what relevant information should be extracted from received SMS data. One such mechanism involves identification of key value pairs in SMS data. Examples of key value pairs that may be identified in SMS data for extraction include: a coupon name, a coupon code, items, services or events for which a coupon is valid, a coupon's expiration time and date, a bill due date, a value of the amount due for a bill, a travel location such as an airport or train station, a ticket number, a plane or train departure time and a plane or train arrival time, among others. Upon identifying one or more key value pairs in an SMS message that information can be extracted and used for categorization as more fully described below.

Upon extracting relevant information from filtered SMS data the extracted information may be categorized into one or more contextual categories in a tiered contextual content hierarchy. The tiered contextual content hierarchy may be arranged such that extracted SMS data and associated supplemental data can be readily provided to a user as feedback upon receiving an indication to provide feedback to a user. First level categorization in the tiered hierarchy may include general categories such as: coupons, retail, dining, travel, finance, events, etc.

Upon categorizing extracted SMS data to one or more first level categories, further categorization into deeper tiers in the assigned categories may then be made. For example, if extracted SMS data has been categorize at the first level into a travel category, it may then be further categorized into lower tiers such as method of transportation (e.g., bus, train, plane, etc.), business or personal, international or domestic, etc. Upon assigning extracted SMS data to one or more categories that data may be tagged with searchable metadata indicating it is associated with one or more categories in a tiered hierarchical index such that it can be readily surfaced to a user as feedback upon the SMS data processing service/system receiving an indication to provide such feedback to the user.

Categorization as described above may employ various techniques in determining which categories should be associated with extracted SMS data. One such technique involves the application of natural language processing. For example, one or more natural language processing engines may receive text from extracted SMS data and evaluate the context of the received text.

Another technique that may be used in categorizing extracted SMS data involves machine learning. Machine learning may identify patterns in SMS messages, such as language patterns, previous categorization of similar messages from which data has been extracted as well as user feedback in order to accurately identify appropriate context of extracted SMS data and appropriate categorization of such data.

Yet another technique that may be used in categorizing extracted SMS data involves evaluation of schema associated with SMS messages. For example, a determination may be made that the schema of an SMS message indicates that the message relates to a restaurant, a travel reservation, a financial institution, etc., and the message may be categorized accordingly. Any of one or more of the above discussed categorization techniques may be used in categorization of extracted SMS data into the contextual content hierarchy.

An indication to provide feedback may be received in the way of a reactive natural language query from a user, such as a user providing a personal digital assistant (e.g., Cortana, Siri Alexa, etc.) with a query. For example, a user may provide a personal digital assistant with a spoken or typed query such as "when is my flight to Seattle?" or "do I have any coupons for Starbucks?". Natural language processing may be used to contextualize the query and identify one or more user intents related to the query in order to provide relevant feedback to the user.

Alternatively, an indication to provide feedback may be received in a proactive manner such as receiving longitude and latitude coordinates from a user's mobile computing device and/or a temporal criteria associated with one or more pieces of extracted SMS data providing an indication that feedback is likely to be useful in completing a user's task. For example, rather than processing a query from a personal digital assistant as described above, received longitude and latitude coordinates may be received from a user's mobile computing device indicating that the user is at or in a threshold vicinity of an airport and a determination may be made that extracted SMS data indicates that the user has a flight reservation leaving within three hours of the time that those coordinates are received. As such, information related to the user's flight, such as a flight confirmation number, a ticket, a gate number for their flight, etc., may be proactively provided to the user at that time.

In addition to providing feedback to a user consisting of information that has been extracted from SMS messages, world knowledge may be used to augment the SMS data for categorization purposes and for surfacing as feedback at a later time. For example, in the scenario that extracted SMS data includes information such as the name of a business, a web service may be used to identify what kind of business that information corresponds to (e.g., restaurant, retail service, airport, etc.) as well as other information such as hours of operation, products or services offered at that location, reviews, whether the business has coupons or discounted rates available online, etc. The systems described herein may also perform additional processing of extracted SMS data prior to, during and/or after categorization of that data such as calculating the average monthly payments for bills, evaluating the weekly, monthly and yearly amounts of money spent on purchases corresponding to various categories (e.g., restaurants, retail, etc.), evaluating the cell phone data usage of user and determining whether a recommendation for a service plan change may be helpful, etc.

Upon categorizing extracted SMS data in the tiered contextual content hierarchy, the categorized data may be stored in a personal data repository which can be queried for providing user feedback at a later time. The personal data repository may be analyzed periodically to determine whether one or more pieces of categorized data should be purged from it. For example, stored data may be analyzed to determine whether a temporal criteria associated with stored data has expired, therefore making the storage of that data unnecessary (e.g., coupon expiration, travel date has passed, etc.).

FIG. 1 is a schematic diagram illustrating an example distributed computing environment 100 for providing contextualized SMS data from one or more SMS messages to a client. Distributed computing environment 100 includes exemplary SMS message sending entities including financial services entity 102 (e.g., credit card companies, debit card companies, banks, etc.), retail services entity 104 (e.g., department stores, local retail stores, online retail services, etc.), travel services entity 106 (e.g., train companies, airline companies, online travel booking companies, etc.) and dining establishments 108 (e.g., coffee shops, restaurants, bars, etc.). Example distributed computing environment 100 further includes SMS message reception context 112, including mobile computing device 114, SMS data processing service 116, including one or more SMS data processing servers 118 and personal data store 120, SMS feedback context 112, including mobile computing device 124 and 126, and network 110.

Any of exemplary SMS message sending entities 102, 104, 106 and 108 may send one or more SMS messages to mobile computing device 114 via network 110. For example, financial services entity may send SMS messages to mobile computing device 114 related to credit card due dates, payment confirmations, ATM transactions, etc. Retail services entity 104 may send SMS messages to mobile computing device 114 related to upcoming sales, coupons that may be used at a retail location, receipts for purchases, etc. Travel services entity 106 may send one or more SMS messages to mobile computing device 114 related to ticket confirmations, travel alerts (e.g., flight gate changes, departure delays, etc.), available travel upgrades, etc. Dining establishments 108 may send SMS messages to mobile computing device 114 related to coupons available for use at a dining establishment, upcoming events at a dining establishment, purchases made at a dining establishment, etc.

Upon receiving one or more SMS messages, SMS data may be extracted from mobile computing device 114 by SMS data processing servers 118 via network 110. SMS data processing servers 118 may extract every received SMS message from client device 114, specific data pieces from SMS messages received by client device 114 and/or only SMS messages or portions of SMS messages that have not been filtered due to a user's privacy settings.

Upon receiving extracted SMS data from mobile device 114, SMS data processing servers 118 may apply one or more filters to the extracted SMS data which are used to identify relevant information in the extracted SMS data. SMS data processing servers 118 may filter the extracted SMS data utilizing standardized schema, whitelists and blacklists and key value pairs. For example, standardized schema, such as schemas described at www.schema.org may be used to filter out irrelevant messaging information, as well as spam content and malicious content such as content distributed by entities that are involved with distributing viruses to access personal information from users.

Whitelists and blacklists may be used as filters to identify and classify relevant information in extracted SMS data.

Whitelists containing the names of one or more trusted senders or metadata associated with one or more trusted senders may be used to determine that SMS data from an extracted message is unlikely to be associated with spam or malicious content and should thus be further processed by SMS data processing servers 118.

Blacklists containing content that has been identified as spam or as likely being malicious (e.g., content that is identified as involving personal information phishing schemes and/or being associated with other virus-related content) may be used to determine that SMS data from an extracted message is likely to be associated with spam or malicious content and should thus not be further processed by SMS data processing servers 118 (i.e., the content should be filtered out).

Additional filters may also be used in relation to extracted SMS message data by SMS data processing service 116. For example, SMS data processing servers 118 may filter information because a schema associated with extracted SMS data does not meet a recognized schema format or pattern. Exemplary filters may also determine that extracted SMS message data should not be further processed by SMS data processing servers 118 because it does not contain a key value pair such as an entity domain, a temporal domain and or a location domain. According to examples such filters may not be applied until extracted SMS data has been analyzed and supplemented with world knowledge metadata. For example, a linked website in extracted SMS data may contain one of an entity, temporal or location domain which are not part of extracted SMS data but that that can be determined by accessing a link provided in extracted SMS data.

SMS data processing servers 118 may run extracted verbal or text data received from mobile computing device 114 through one or more natural language processing engines such that relevant and irrelevant data can be filtered in or filtered out from further processing and categorization in a tiered contextual content hierarchy. SMS data processing servers 118 may additionally or alternatively determine, based on language-based processing of extracted SMS data, that one or more keywords, phrases or language patterns are implicated and that the identified SMS data should or should not be further processed and contextually classified by SMS data processing servers 118.

SMS data processing servers 118 may receive filtered SMS data and categorize it based on schema recognition, natural language processing, pattern recognition, machine learning, user feedback, etc. Categorization may involve natural language processing of the received SMS data by SMS data processing servers 118 and performing search engine queries related to extracted SMS data by SMS data processing servers 118

Identification of relevant content and categorization of that content may be aided by data augmentation and/or metadata attachment related to automated/dynamic search engine queries performed by SMS data processing servers 118 that are based on natural language extraction of SMS messages and extracted SMS data (e.g., categorization of a name provided in an SMS message such as "Avanti," and phrases such as "20% off your dinner or drinks at Avanti," etc.) which can be associated with hierarchically relevant classification criteria such as: restaurant and bar, hours of operation, review history, menu, and popular customer times.

SMS data processing service 116 also includes personal data store 120 which may comprise one or more servers and/or data storage units that store categorized SMS data and associated searchable metadata such that feedback related to a user query or task may be reactively and proactively provided. Personal data store 120 may be analyzed periodically to determine whether storage utilized in an inefficient manner. For example an analysis may be made as to whether content stored in personal data store 120 is no longer relevant and should thus be purged or otherwise deleted to eliminate hardware space requirements and associated processing costs. Such analysis may include identifying SMS data and/or associated augmented content in relation to extracted SMS data that has been categorized with SMS data such as, for example, a coupon that is no longer valid because of associated temporal data, a ticket for travel (e.g., bus, train, plane) that indicates that the departure time has expired, pattern recognition that indicates that an account such as a credit card account is no longer in service, etc.

Figure 2:
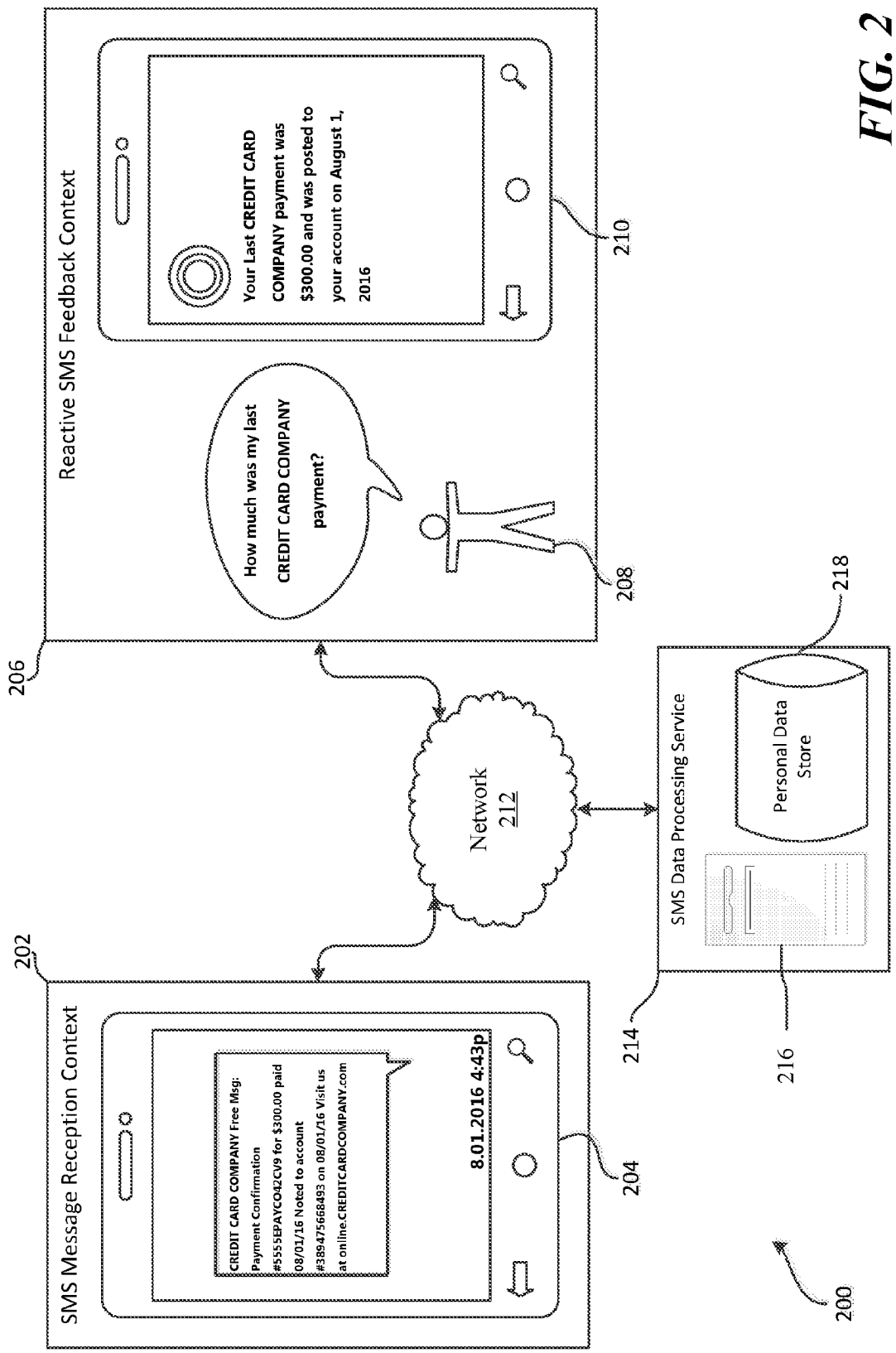
FIG. 2 illustrates an example scenario whereby an SMS message received in a first context is contextualized and the contextualized SMS data is provided to a user during a second context based on a reactive indication to provide feedback received by an SMS data processing service.

FIG. 2 illustrates an example scenario 200 in which an SMS message received by mobile computing device 204 is processed, categorized and stored, via network 212 and SMS data processing service 214. Example scenario 200 shows feedback of categorized SMS data as provided to user 208 via network 212 (via mobile computing device 210 which may or may not be the same device as mobile computing device 204), during reactive SMS feedback context 206 based on an indication to provide feedback provided by mobile computing device 210.

Specifically, SMS message reception context 202 shows mobile computing device 204 which has received an SMS message that has a standardize schema for a credit card company indicating a credit card payment has been made for that company in the amount of $300.00 on Aug. 1, 2016 at 4:43 pm. Data from that SMS message may be extracted by SMS data processing service 214, filtered to obtain relevant information, augmented with related information, and stored in personal data store 218.

Reactive SMS feedback context shows user 208 providing a computing device such as mobile computing device 210 with the query "How much was my last CREDIT CARD COMPANY payment?" via a digital personal assistant. SMS feedback context 206 shows mobile computing device 210, which may or may not be the same computing device as mobile computing device 204, providing feedback related to the users 208's query, providing that the users 208's last CREDIT CARD COMPANY payment was in the amount of $300.00 and that the users 208's last payment of $300.00 was posted to their CREDIT CARD COMPANY account on Aug. 1, 2016.

Figure 3:
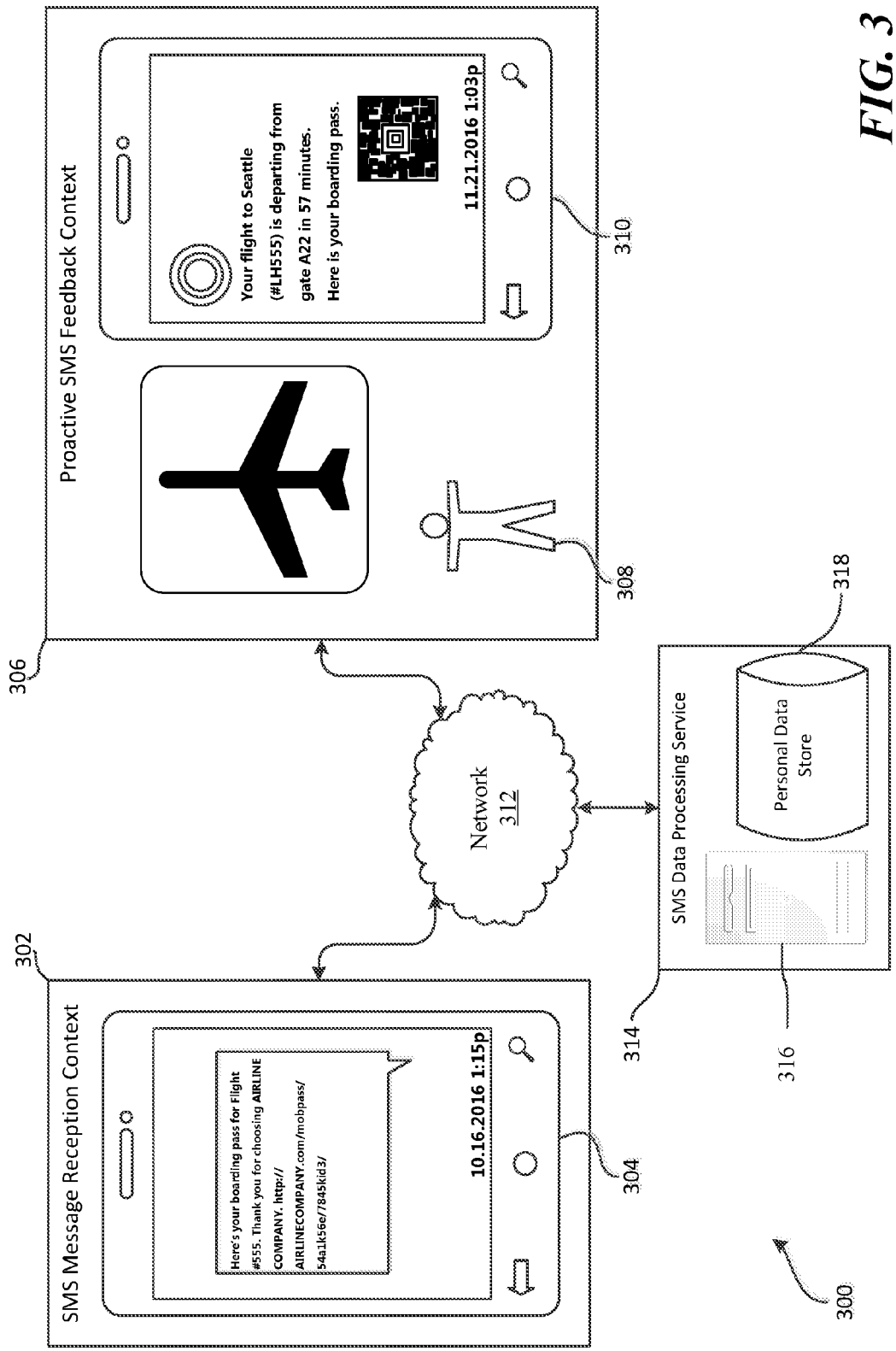
FIG. 3 illustrates an example scenario whereby an SMS message received in a first context is contextualized and the contextualized SMS data is provided to a user during a second context based on a proactive indication to provide feedback received by an SMS data processing service.

FIG. 3 illustrates an example scenario 300 in which an SMS message received by mobile computing device 304 is processed, categorized and stored, via network 312 and SMS data processing service 314. Example scenario 300 shows feedback of categorized SMS data as provided to user 208 via network 312 (via mobile computing device 310), which may or may not be the same device as mobile computing device 304, during proactive SMS feedback context 306 based on an indication to provide feedback, the indication being provided by mobile computing device 310.

SMS message reception context 302 shows mobile computing device 304 which has received an SMS message that has a standardize schema for flight reservations, the SMS message being received on Oct. 16, 2016 at 1:15 pm. Data from that SMS message may be extracted by SMS data processing service 314, filtered to obtain relevant information, augmented with related information, and stored in personal data store 318.

Proactive SMS feedback context 306 shows a user 308, that has provided SMS data processing service 314, with an indication, via time and/or GPS coordinates (i.e., longitude and latitude coordinates), that feedback related to user 308's trip is likely to be helpful in travel task completion. Proactive SMS feedback context 306 shows proactive feedback being provided to user 308 via mobile computing device 310, as provided by SMS data processing service 314 and the augmented SMS content in personal data store 318.

The proactive feedback sent by SMS data processing service 314 to user 308's mobile computing device 310 includes a barcode to scan at their flight departure gate to board their flight (extracted from data received from the SMS message received in SMS message reception context 302), the current gate at which their flight will depart (information supplemented by augmenting stored SMS content in personal data store 318 with world knowledge), and a reminder that their flight to Seattle departs in 57 minutes (based on the proactive SMS feedback context indicating that there is a current time of 1:03 pm and that user 308's mobile computing device 310 is at a geographic location relating to the airport of departure).

Figure 4:
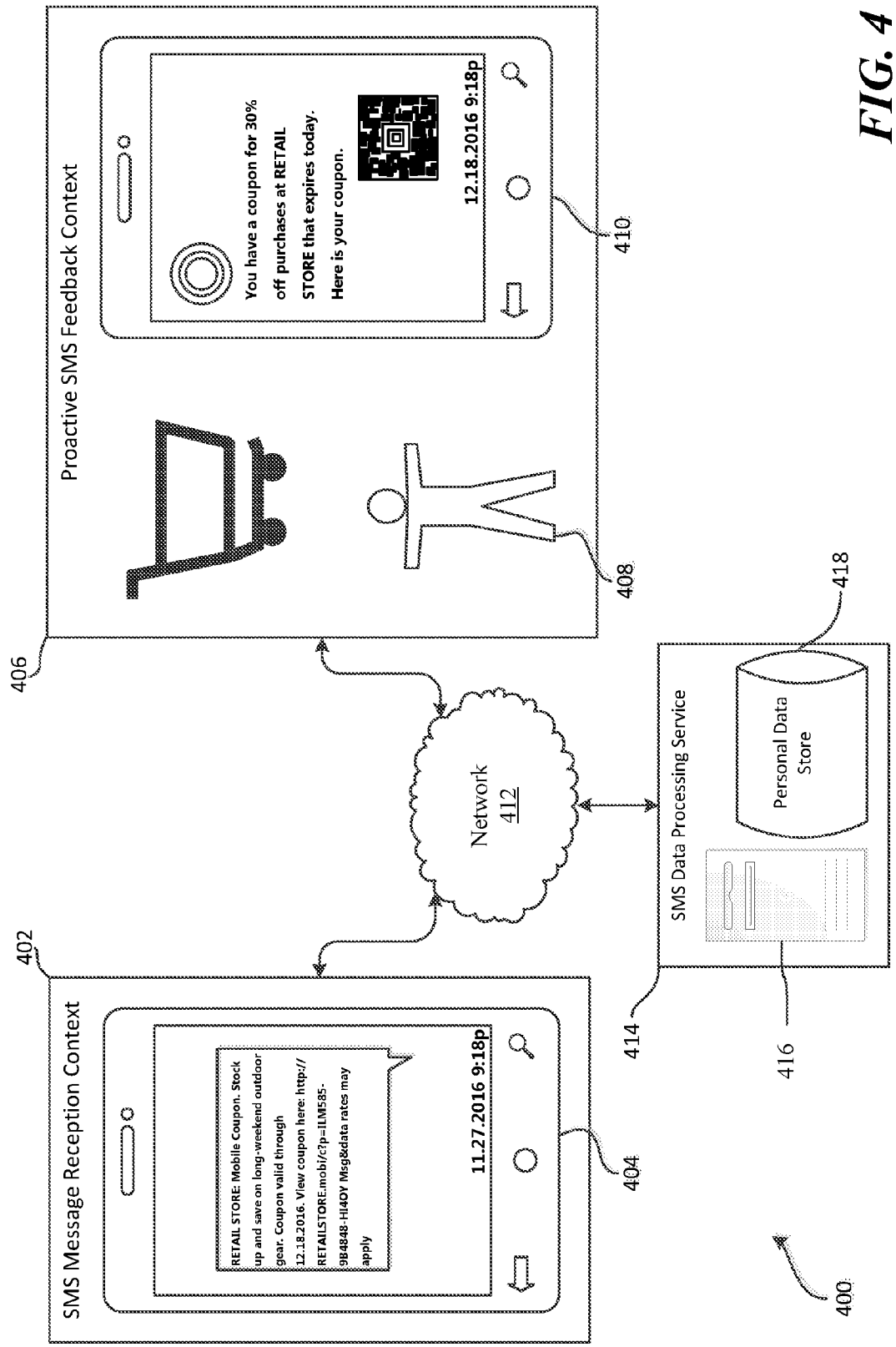
FIG. 4 illustrates an example scenario whereby an SMS message received in a first context is contextualized and the contextualized SMS data is provided to a user during a second context based on a proactive indication to provide feedback received by an SMS data processing service.

FIG. 4 illustrates an example scenario 400 in which an SMS message received by mobile computing device 404 is processed, categorized and stored, via network 412 and SMS data processing service 414. Example scenario 400 shows feedback of categorized SMS data as provided to user 408 via network 412 (via mobile computing device 410 which may or may not be the same device as mobile computing device 404), during proactive SMS feedback context 406 based on an indication to provide feedback, the indication being provided by mobile computing device 410.

Specifically, SMS message reception context 402 shows mobile computing device 404 which has a received an SMS message that has a standardize schema for a retail store and a coupon for that retail store, the SMS message being received on November 27 at 9:18 pm. Data from that SMS message may be extracted by SMS data processing service 414, filtered to obtain relevant information, augmented with related information, and stored in personal data store 418.

Proactive SMS feedback context 406 shows a user 408, that has provided SMS data processing service 414 with an indication, via time and/or GPS coordinates (i.e., longitude and latitude coordinates), that feedback related to extracted SMS retail content (e.g., a coupon valid at a retail entity) is likely to be helpful in retail task completion. For example, data provided to SMS data processing service 414 via mobile computing device 410 may indicate that user 408 is within a threshold distance of the retail store that sent a link to a coupon in an SMS message to user 408 during SMS message reception context 402.

Proactive SMS feedback context 406 shows proactive feedback being provided to user 408 via mobile computing device 410, as provided by SMS data processing service 414 and the augmented SMS content in personal data store 418.

The proactive feedback sent by SMS data processing service 414 to user 408's mobile computing device 410 includes a barcode which can scanned to receive the discount provided by a retail coupon, the amount of the discount available to user 408 (extracted from data received from the SMS message received in SMS message reception context 402) and the fact that the coupon will expire on the date that the feedback is provided during proactive SMS feedback context 406 (based on the proactive SMS feedback context indicating that there is a current date of Nov. 18, 2016 and analysis by SMS data processing servers 416 of content in the SMS message provided during SMS message reception context 402 and/or augmentation of that content via world knowledge).

Figure 5:
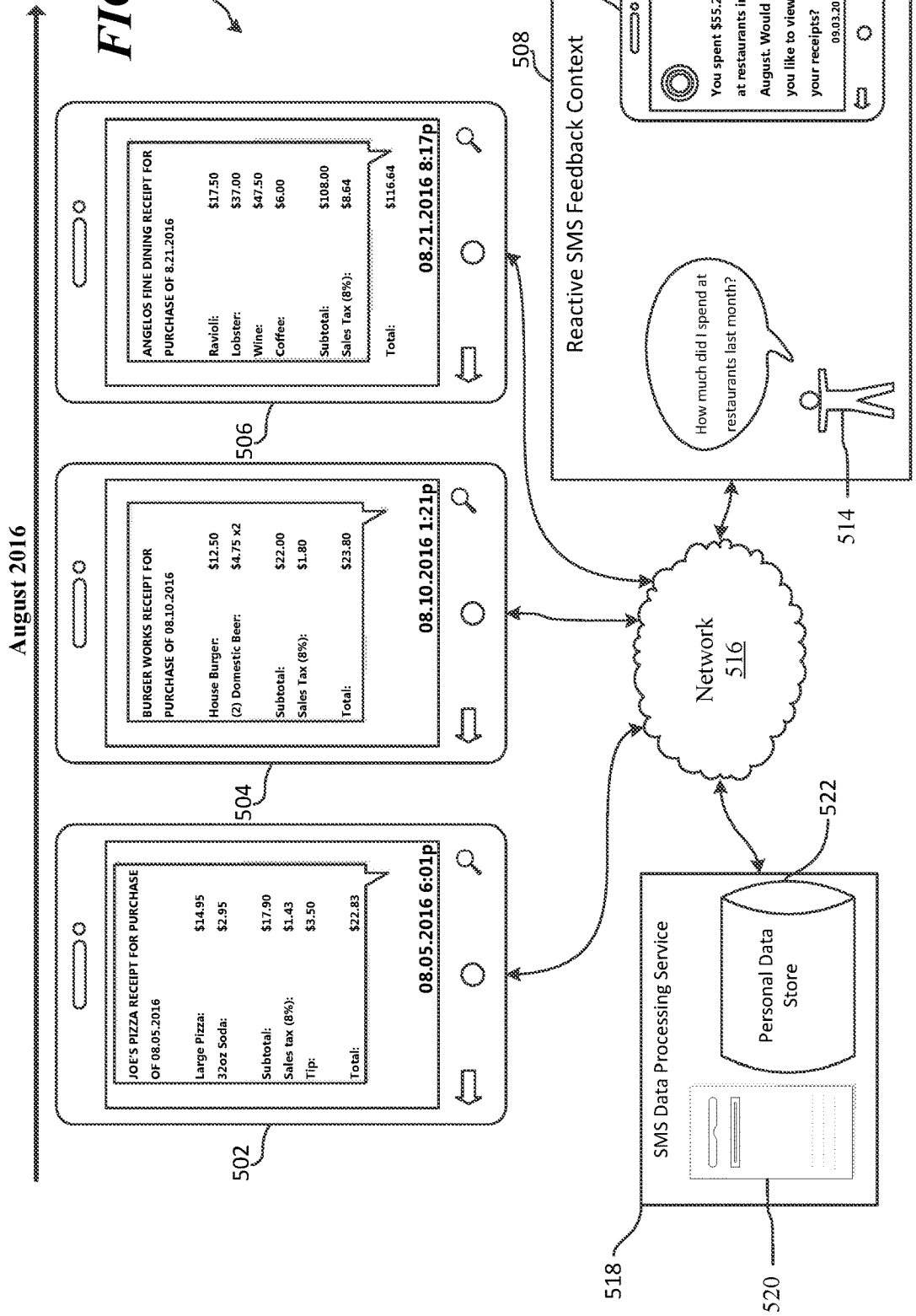
FIG. 5 illustrates an example scenario whereby three SMS messages received from three separate contexts are contextualized and the contextualized SMS data is provided to a user during a fourth context based on a reactive indication to provide feedback received by an SMS data processing service.

FIG. 5 illustrates an example scenario 500 in which three SMS messages are received from three separate contexts are contextualized by SMS data processing service 518 and the contextualized SMS data is provided to a user 514 during reactive SMS feedback context 508 based on a reactive indication to provide feedback received by SMS data processing service 518.

A first context shows a mobile computing device 502 receiving an SMS receipt for user 514's purchases at Joe's Pizza on Aug. 5, 2016. A second context shows a mobile computing device 504 receiving an SMS receipt for user 514's purchase at Burger Works on Aug. 10, 2016. A third context shows a mobile computing device 506 receiving an SMS receipt for user 514's purchase at Angelos Fine Dining.

Data from the SMS receipts is extracted by SMS data processing service 518 via network 516, analyzed by SMS data processing servers 520 and stored in personal data store 522. In addition to extracting, categorizing and storing the receipts, SMS data processing service 518 may augment the SMS data by utilizing the categorization of data from SMS messages, including the receipts into a monthly dining expense category and calculating a value for the amount of money that user 514 spent on dining during the month of August 2016.

SMS feedback context 508 shows user 514 providing, via network 516, SMS data processing service 518 with a query asking "How much did I spend at restaurants last month?". SMS data processing servers 520 may use natural language processing to determine what information associated with content stored in personal data store 522 should be provided to user 514 as relevant feedback in relation to user 514's query in reactive SMS feedback context 508.

Mobile computing device 512 shows a response, provided via a personal digital assistant, to user 514's query comprised of augmented data received from user 514's SMS dining receipts for the month of August 2016, indicating that user 514 spent $55.27 at restaurants in the month of August and that user 514's individual receipts for each of user 514's restaurant transactions during the month of August 2016 may be viewed if desired.

Figure 6:
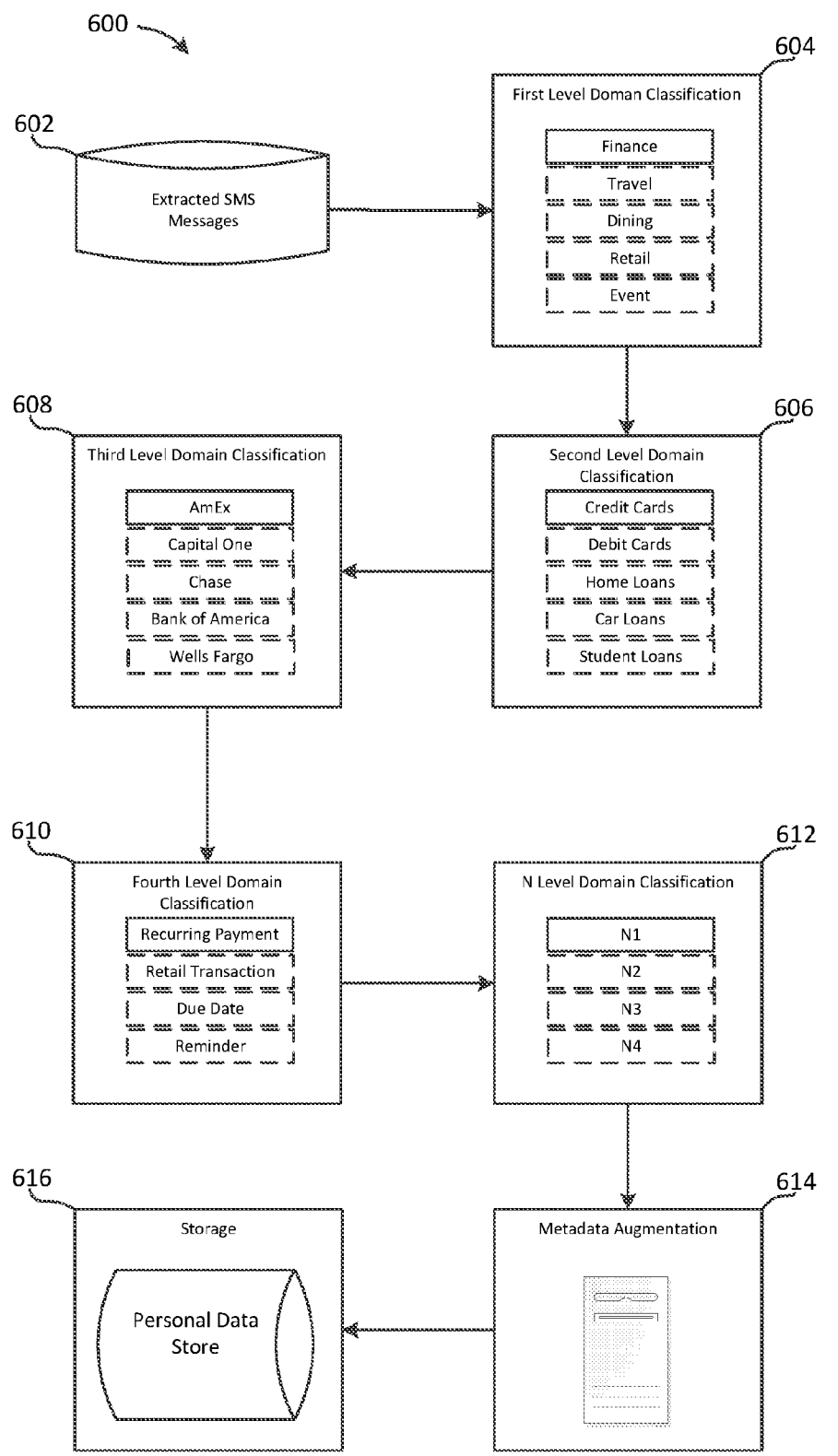
FIG. 6 illustrates hierarchical categorization and contextualization of SMS messages by an SMS data processing service.

FIG. 6 illustrates a simplified diagram 600 of a hierarchical categorization and contextualization of SMS messages by an SMS data processing service. Extracted SMS messages 602 may be processed by one or more SMS data processing servers. Upon extraction of those SMS messages categorization of those messages and the content therein may be made by SMS data processing servers. For example, natural language processing, key value pair evaluation, machine learning processing, SMS data augmentation and schema analysis may be utilized to assign the extracted SMS data to one or more categories in a tiered contextual content hierarchy.

At first level domain classification 604 the above techniques may be used to classify extracted SMS data into exemplary categories such as finance, travel, dining, retail, and event. Upon determining that that a first level domain classification 604 of finance is to be associated with extracted SMS content a further classification may made at second level domain classification 606 as to whether the extracted SMS content should be classified in second tiered categories in finance related to credit cards, debit cards, home loans and student loans, for example.

Upon determining that a second level domain classification 606 of credit cards is to be associated with extracted SMS content a further classification may be made at a third level domain classification 608 as to whether the extracted SMS content should be classified in third tiered categories in finance related to AmEx, Capital One, Chase, Bank of America and Wells Fargo, for example.

Upon determining that a third level domain classification 608 of AmEx is to be associated with extracted SMS content a further classification may be made at a fourth level domain classification 610 as to whether the extracted SMS content should be classified in fourth tiered categories in finance related to recurring payment, retail transaction, due date and reminder, for example.

Upon determining that fourth level domain classification 610 of recurring payment is to be associated with extracted SMS content a further classification may be made at N levels of domain classifications 612 until a lowest tier of the contextual content hierarchy of the finance hierarchy is reached.

Upon categorization of the extracted SMS data into the lowest level of the finance hierarchy, additional augmentation during metadata augmentation 614 of that data may be made. For example, metadata associated with each tier of the hierarchy may be associated with the extracted SMS data such that queries related to those categories may be surfaced as relevant feedback to a user for task completion. Augmentation may include analyzing world knowledge associated with the extracted SMS data provided by automated web searches implemented in relation to natural language processing of extracted SMS messages and the categorization of the data in those extracted SMS messages.

The augmented, categorized SMS data may be stored in a personal data store at storage 616. The stored SMS data may be analyzed periodically to determine whether one or more stored pieces of data should be purged from storage 616 because of an expiration date or another indication that the stored SMS data is unlikely to be accessed by a user at a later time.

Figure 7:
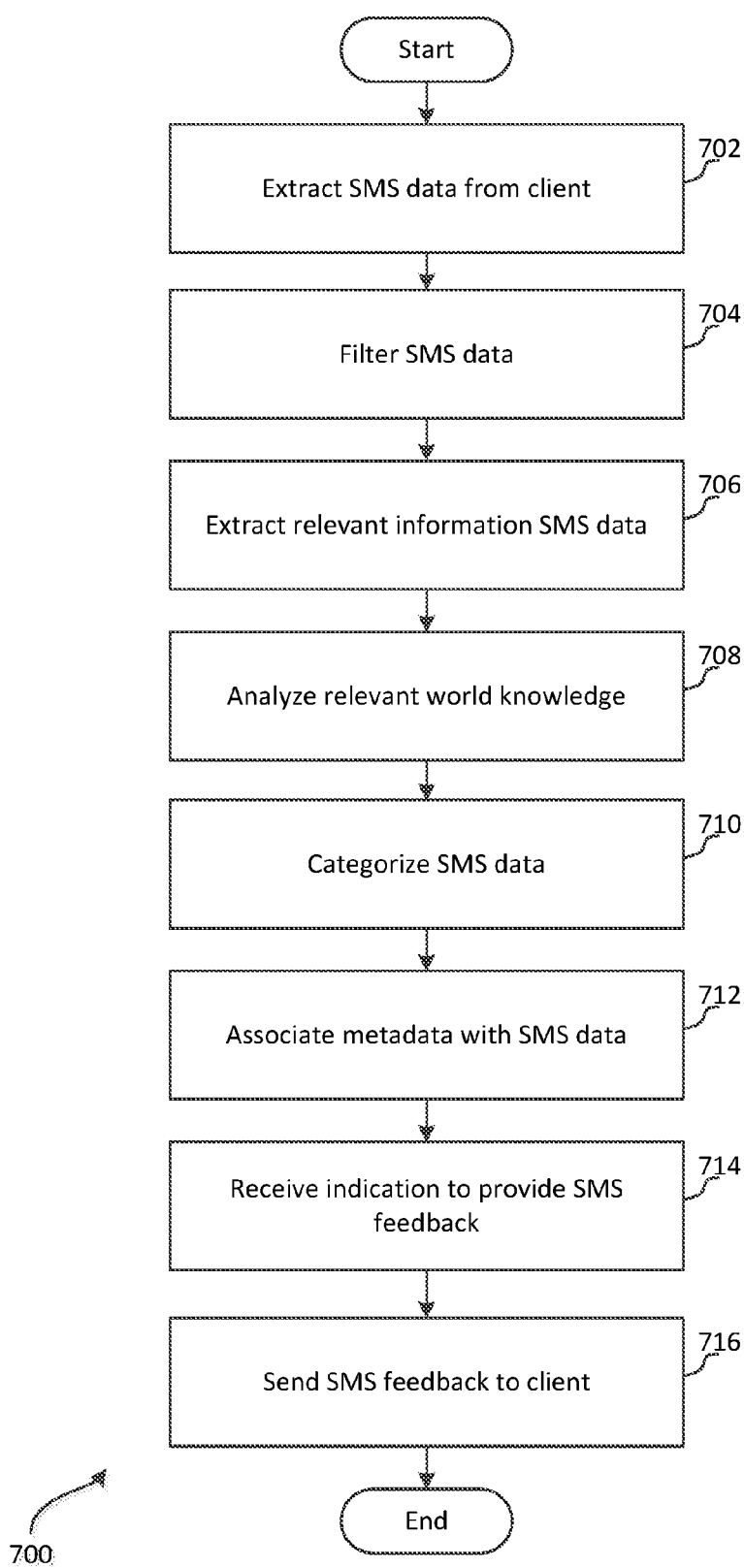
FIG. 7 is an exemplary method for providing contextualized short message service data from one or more SMS messages to a client.

FIG. 7 is an exemplary method 700 for providing contextualized short message service data from one or more SMS messages to a client. At operation 702 SMS data is extracted from a client. A client may be one or more user computing device such as a smart phone, a tablet, a laptop or other computing device by which a user receives SMS messages. Extracted SMS data may or may not include personal information for a user, depending on user privacy settings.

Upon extracting SMS data from the client flow continues to operation 704 where SMS data from the extracted SMS data is filtered. Filtering may include techniques such as analyzing standardized schemas, comparison of the extracted SMS data against whitelists and blacklists, key value pair analysis, and keyword recognition, among other techniques.

Moving to operation 706 relevant information from SMS data is extracted. Second level extraction of SMS data as implemented at operation 706 may involve ontology analysis of extracted data to determine whether natural language analysis and language pattern recognition can be used to determine whether extracted SMS data relates to one or more categories in a tiered contextual content hierarchy.

At operation 708 evaluation of world knowledge to determine the context of extracted SMS information and an analysis of whether patterns in the extracted information relate to one or more categories in a tiered contextual content hierarchy is performed. For example, an entity name from extracted SMS data may be provided to web search engine to determine whether it relates to one or more categories in a tiered contextual content hierarchy (e.g., financial entity, travel service entity, retail entity, etc.).

Moving to operation 710 and 712 the analysis performed at operations 706 and 708 is utilized to categorize extracted SMS data into one or more tiered contextual categories and that categorization is associated with the categorized SMS data using metadata.

At operation 714 an indication to provide SMS feedback to a user is received. The indication to provide feedback may be provided reactively or proactively. In the reactive scenario the indication may be received due to a user providing a query related to categorized SMS data and in the proactive scenario the indication may be received due to a user's computing device sending locational coordinates and further processing of those coordinates to determine an entity type, in addition to a temporal criteria, to one or more SMS data processing servers.

At operation 716 SMS feedback is provided to a client related to the indication to provide feedback at operation 714. The SMS feedback may be reactive or proactive feedback as described above. Such feedback may be provided to a user by a personal digital assistant or other means such as a task completion application and may be specifically tailored to a current scenario or to analysis of extracted SMS data such as calculations related to user patterns over time.

Figure 8:
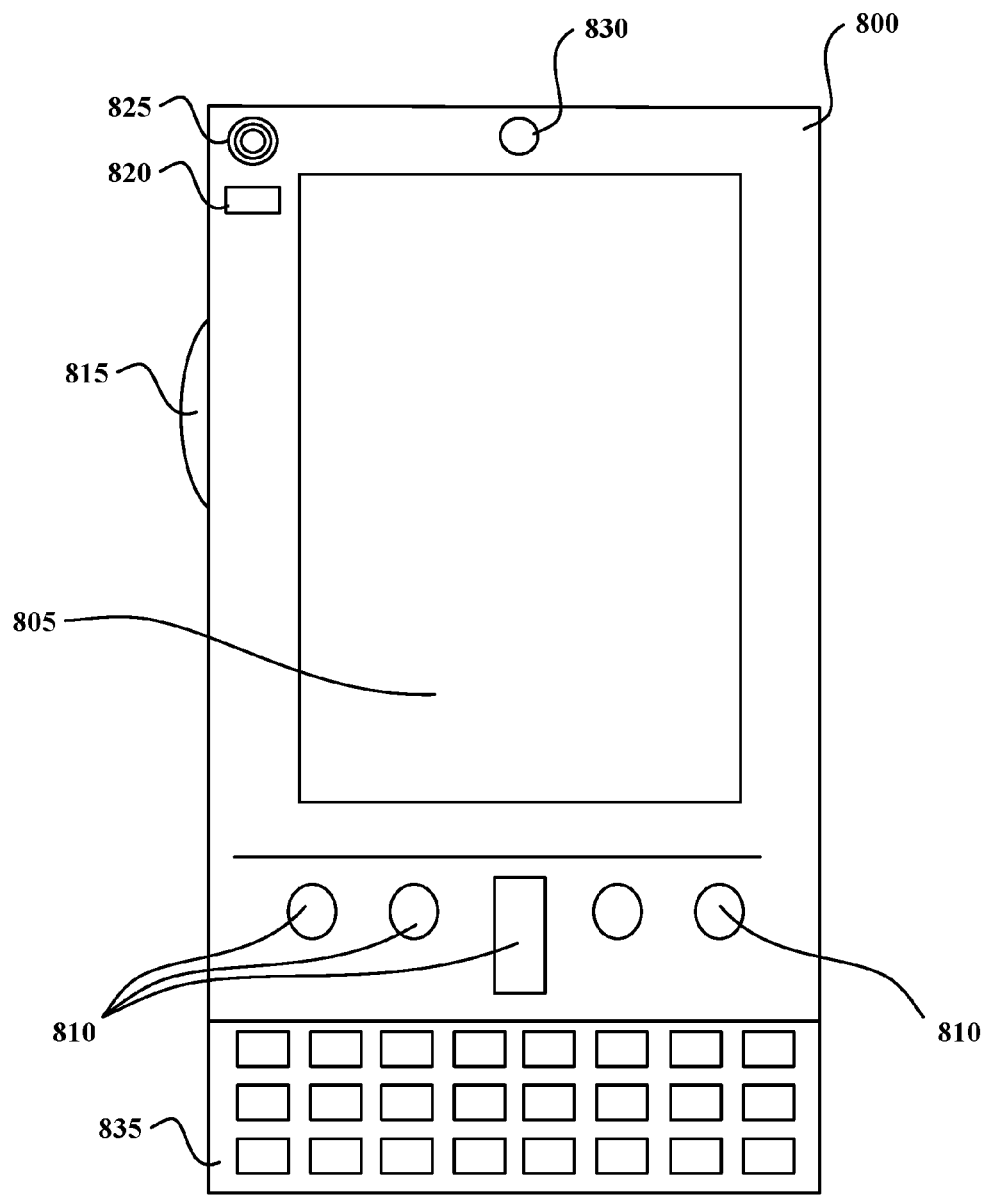
FIG. 8 illustrates a computing device for executing one or more aspects of the present disclosure.
Figure 9:
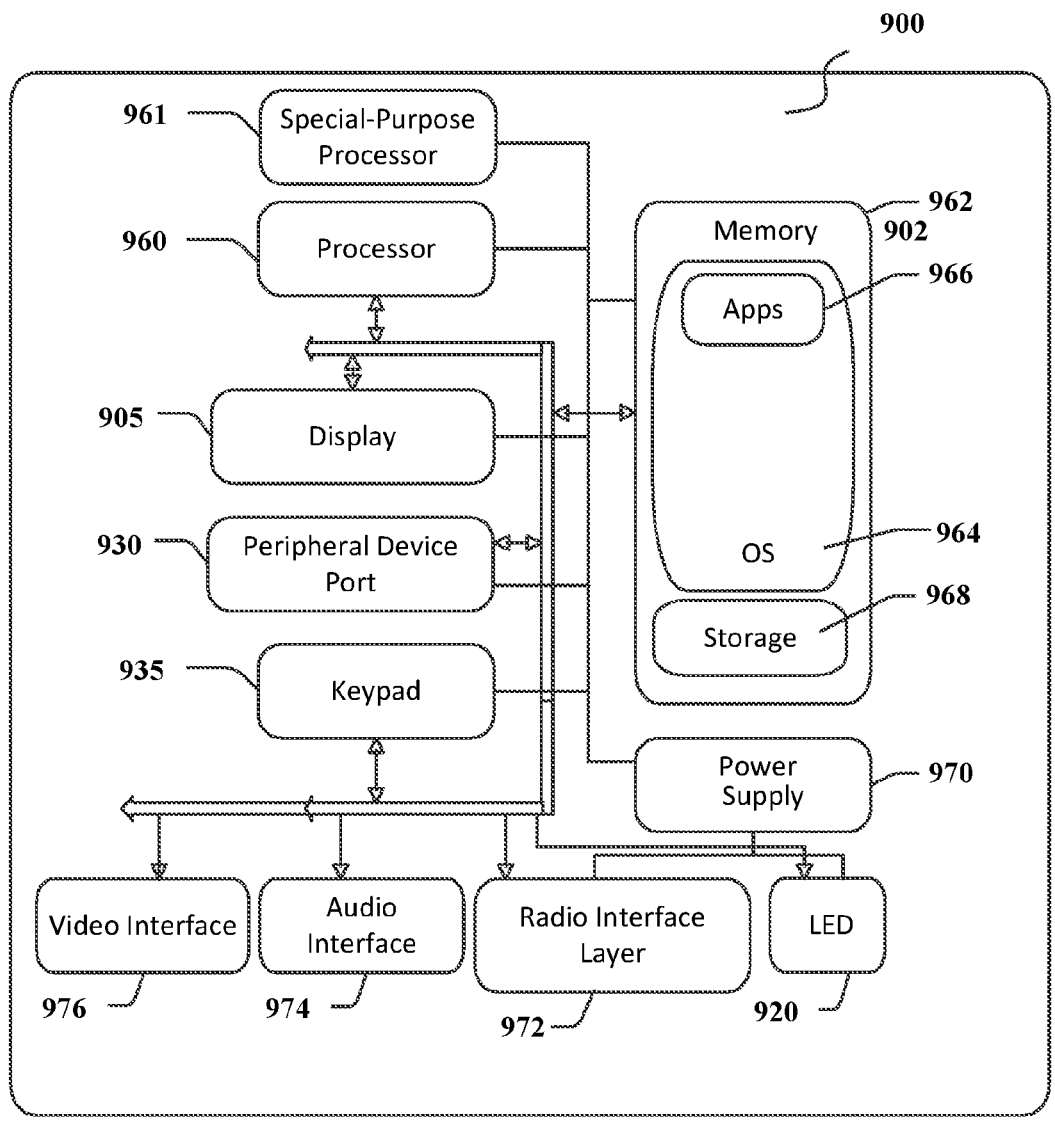
FIG. 9 is a simplified block diagram of a computing device with which aspects of the present disclosure may be practiced.

FIG. 8 and FIG. 9 illustrate computing device 800, for example, a mobile telephone, a smart phone, a tablet personal computer, a laptop computer, and the like, with which embodiments of the disclosure may be practiced. With reference to FIG. 8, an exemplary mobile computing device 800 for implementing the embodiments is illustrated. In a basic configuration, the mobile computing device 800 is a handheld computer having both input elements and output elements. The mobile computing device 800 typically includes a display 805 and one or more input buttons 810 that allow the user to enter information into the computing device 800. The display 805 of the mobile computing device 800 may also function as an input device (e.g., a touch screen display). If included, an optional side input element 815 allows further user input. The side input element 815 may be a rotary switch, a button, or any other type of manual input element.

In alternative embodiments, mobile computing device 800 may incorporate more or less input elements. For example, the display 805 may not be a touch screen in some embodiments. In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display.

In various embodiments, the output elements include the display 805 for showing a graphical user interface (GUI), a visual indicator 820 (e.g., a light emitting diode) and/or an audio transducer 825 (e.g., a speaker). In some embodiments, the mobile computing device 800 incorporates a vibration transducer for providing the user with tactile feedback. In yet another embodiments, the mobile computing device 800 incorporates input and/or output ports, such as an audio input (e.g., a microphone jack), an audio output (e.g., a headphone jack), and a video output (e.g., a HDMI port) for sending signals to or receiving signals from an external device. In embodiments, the word processing application may be displayed on the display 805.

FIG. 9 is a block diagram illustrating the architecture of one embodiment of a mobile computing device. That is, the mobile computing device 900 can incorporate a system (i.e., an architecture) 902 to implement some aspects of the disclosure. In one aspect the system 902 is implemented as a "smart phone" capable of running one or more applications (e.g., browser, e-mail, calendaring, contact managers, messaging clients, games, and media clients/players). In some aspects, the system 902 is integrated as a computing device, such as an integrated personal digital assistant (PDA) and a wireless phone.

One or more application programs 966 may be loaded into the memory 962 and run on or in association with the operating system 964. Examples of the application programs include phone dialer programs, e-mail programs, personal information management (PIM) programs, word processing programs, spreadsheet programs, Internet browser programs, messaging programs, diagramming applications, and so forth. The system 902 also includes a non-volatile storage area 968 within the memory 962. The non-volatile storage area 968 may be used to store persistent information that should not be lost if the system 902 is powered down. The application programs 966 may use and store information in the non-volatile storage area 968, such as e-mail or other messages used by an e-mail application, and the like.

A synchronization application (not shown) also resides on the system 902 and is programmed to interact with a corresponding synchronization application resident on a host computer to keep the information stored in the non-volatile storage area 968 synchronized with corresponding information stored in the host computer. As should be appreciated, other applications may be loaded into the memory 962 and run on the mobile computing device 900, including steps and methods for providing contextualized short message service data from one or more SMS messages to a client.

The system 902 has a power supply 970, which may be implemented as one or more batteries. The power supply 970 might further include an external power source, such as an AC adapter or a powered docking cradle that supplements or recharges the batteries.

The system 902 may also include a radio 972 that performs the functions of transmitting and receiving radio frequency communications. The radio 972 facilitates wireless connectivity between the system 902 and the "outside world," via a communications carrier or service provider. Transmissions to and from the radio 972 are conducted under control of the operating system 964. In other words, communications received by the radio 972 may be disseminated to the application programs 966 via the operating system 964, and vice versa. The radio 972 allows the system 902 to communicate with other computing devices such as over a network. The radio 972 is one example of communication media. Communication media may typically be embodied by computer readable instructions, data structures, program modules, or other data in a modulated data signal, such as a carrier wave or other transport mechanism, and includes any information deliver media. The term "modulated data signal" means a signal that has one or more of its characteristics set or changed in such a manner as to encode information in the signal. By way of example, not limitation, communication media includes wired media such as a wired network or direct-wired connection, and wireless media such as acoustic, RF infrared and other wireless media. The term computer readable media is used herein includes both storage media and communication media.

This embodiment of the system 902 provides notifications using the visual indicator 820 that can be used to provide visual notifications and/or an audio interface 974 producing audible notifications via the audio transducer 825. In the illustrated embodiment, the visual indicator 820 is a light emitting diode (LED) and the audio transducer 825 is a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 825, the audio interface 974 may also be coupled to a microphone to receive audible input, such as to facilitate a telephone conversation. In accordance with embodiments of the present invention, the microphone may also serve as an audio sensor to facilitate control of notifications, as will be described below. The system 902 may further include a video interface 976 that enables an operation of an on-board camera 830 to record still images, video stream, and the like.

A mobile computing device 900 implementing the system 902 may have additional features or functionality. For example, the mobile computing device 900 may also include additional data storage devices (removable and/or non-removable) such as, magnetic disks, optical disks, or tape. Such additional storage is illustrated in FIG. 9 by the non-volatile storage area 968. Computer storage media may include volatile and nonvolatile, removable and non-removable media implemented in any method or technology for storage of information, such as computer readable instructions, data structures, program modules, or other data.

Data/information generated or captured by the mobile computing device 900 and stored via the system 902 may be stored locally on the mobile computing device 900, as described above, or the data may be stored on any number of storage media that may be accessed by the device via the radio 972 or via a wired connection between the mobile computing device 900 and a separate computing device associated with the mobile computing device 900, for example, a server computer in a distributed computing network, such as the Internet. As should be appreciated such data/information may be accessed via the mobile computing device 900 via the radio 972 or via a distributed computing network. Similarly, such data/information may be readily transferred between computing devices for storage and use according to well-known data/information transfer and storage means, including electronic mail and collaborative data/information sharing systems.

One of skill in the art will appreciate that the scale of systems such as system 902 may vary and may include more or fewer components than those described in FIG. 9. In some examples, interfacing between components of the system 902 may occur remotely, for example where components of system 902 may be spread across one or more devices of a distributed network. In examples, one or more data stores/storages or other memory are associated with system 902. For example, a component of system 902 may have one or more data storages/memories/stores associated therewith. Data associated with a component of system 902 may be stored thereon as well as processing operations/instructions executed by a component of system 902.

Figure 10:
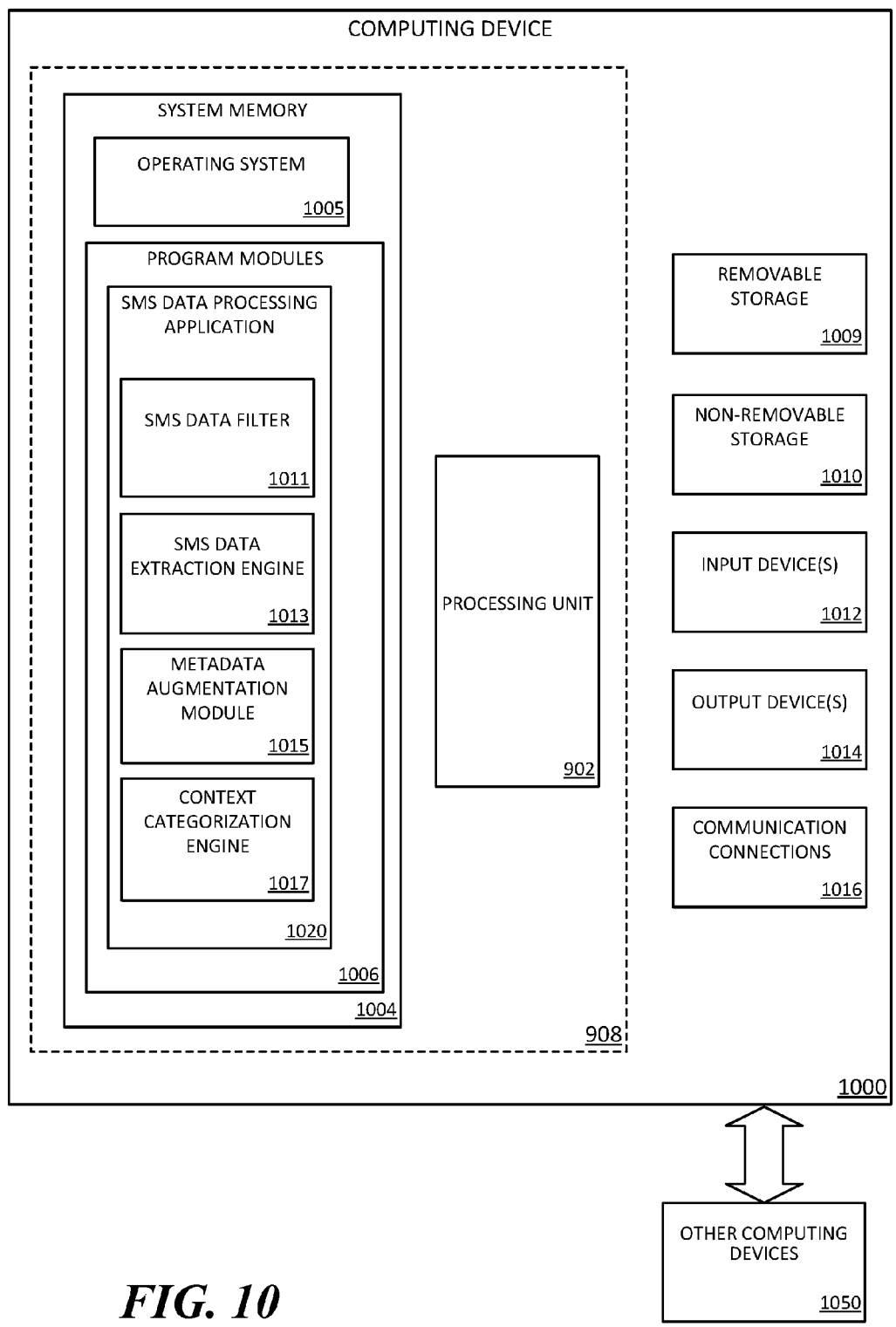
FIG. 10 is a block diagram illustrating physical components (e.g., hardware) of a computing device 1000 with which aspects of the present disclosure may be practiced.

FIG. 10 is a block diagram illustrating physical components (e.g., hardware) of a computing device 1000 with which aspects of the disclosure may be practiced. The computing device components described below may have computer executable instructions for assisting with SMS data contextualization including receiving SMS data from a client; filtering the SMS data with one or more content filters; extracting relevant information iinto one or more contextual categories in a tiered contextual content hierarchy, the categorizing comprising analyzing world knowledge related to the extracted information; associating searchable context metadata with the categorized information; receiving an indication to provide feedback related to the received SMS data from the client; and providing, based on the associated context metadata, feedback related to the received SMS data to the client, including computer executable instructions for SMS data processing application 1020 that can be executed to employ the methods disclosed herein.

In a basic configuration, the computing device 1000 may include at least one processing unit 1002 and a system memory 1004. Depending on the configuration and type of computing device, the system memory 1004 may comprise, but is not limited to, volatile storage (e.g., random access memory), non-volatile storage (e.g., read-only memory), flash memory, or any combination of such memories. The system memory 1004 may include an operating system 1005 and one or more program modules 1006 suitable for SMS data processing application 1020, such as one or more components in regards to FIG. 10 and, in particular, SMS data filter 1011, SMS data extraction engine 1013, metadata augmentation module 1015 and context categorization engine 1017.

The operating system 1005, for example, may be suitable for controlling the operation of the computing device 1000. Furthermore, aspects of the disclosure may be practiced in conjunction with a graphics library, other operating systems, or any other application program and is not limited to any particular application or system. This basic configuration is illustrated in FIG. 10 by those components within a dashed line 1008. The computing device 1000 may have additional features or functionality. For example, the computing device 1000 may also include additional data storage devices (removable and/or non-removable) such as, for example, magnetic disks, optical disks, or tape. Such additional storage is illustrated in FIG. 10 by a removable storage device 1009 and a non-removable storage device 1010.

As stated above, a number of program modules and data files may be stored in the system memory 1004. While executing on the processing unit 1002, the program modules 1006 (e.g., SMS data processing application 1020) may perform processes including, but not limited to, the aspects, as described herein. Other program modules that may be used in accordance with aspects of the present disclosure, and in particular may include a spam identification module, a malicious content module, an intent analysis engine, a key value pair identification engine, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 10 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 900 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1000 may also have one or more input device(s) 1012 such as a keyboard, a mouse, a pen, a sound or voice input device, a touch or swipe input device, etc. The output device(s) 1014 such as a display, speakers, a printer, etc. may also be included. The aforementioned devices are examples and others may be used. The computing device 1000 may include one or more communication connections 1016 allowing communications with other computing devices 1050. Examples of suitable communication connections 1016 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1004, the removable storage device 1009, and the non-removable storage device 1010 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1000. Any such computer storage media may be part of the computing device 1000. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The different aspects described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure.

As stated above, a number of program modules and data files may be stored in the system memory 1004. While executing on processing unit 1002, program modules (e.g., applications, Input/Output (I/O) management, and other utilities) may perform processes including, but not limited to, one or more of the operational stages of the methods described herein.

Figure 11:
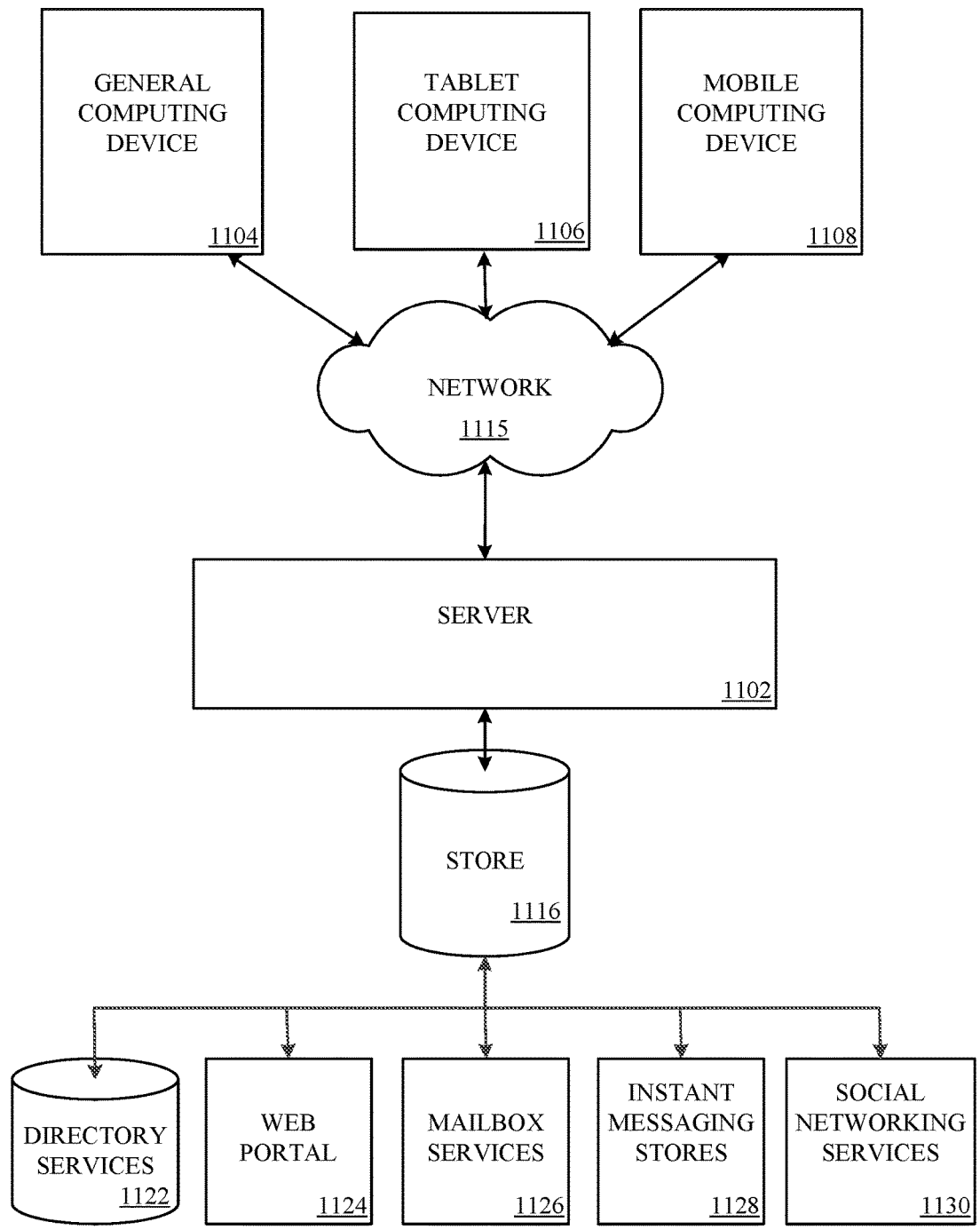
FIG. 11 is a schematic diagram illustrating an example distributed computing environment for providing contextualized short message service data from one or more SMS messages to a client.

FIG. 11 illustrates one example of the architecture of a system for providing an application assists with SMS data contextualization as described above. SMS data may be accessed, interacted with, or edited in association with programming modules, SMS data processing application 1006 and storage/memory which may be stored in different communication channels or other storage types. For example, various documents may be stored using a directory service 1122, a web portal 1124, a mailbox service 1126, an instant messaging store 1128, or a social networking site 1130, application 1006, an 10 manager, other utilities and storage systems may use any of these types of systems or the like for enabling data utilization, as described herein. A server 1102 may provide a storage system for use by a client operating on a general computing device 1104 and mobile computing devices 1106 through network 1115. By way of example, network 1115 may comprise the Internet or any other type of local or wide area network, and client nodes may be implemented as a computing device embodied in a personal computer, a tablet computing device 1106, and/or by a mobile computing device 1108 (e.g., mobile processing device). Any of these examples of the computing devices described herein may obtain content from the store 1116.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method for providing contextualized short message service (SMS) data from one or more SMS messages to a client, comprising:
   receiving SMS data from a client at a server, the SMS data previously being received at the client;
   filtering the SMS data with one or more content filters;
   extracting relevant information from the filtered SMS data;
   categorizing the extracted information into one or more contextual categories in a tiered contextual content hierarchy, the categorizing comprising analyzing world knowledge related to the extracted information;
   associating searchable context metadata with the categorized information;
   receiving a request to provide feedback related to the previously received SMS data from the client, the request to provide feedback including a user request related to the previously received SMS data from the client; and
   providing, based on the associated context metadata, feedback related to the received SMS data to the client.

2. The method of claim 1, wherein filtering the SMS data with one or more content filters comprises determining whether the one or more SMS messages meet one or more spam criteria.

3. The method of claim 2, wherein filtering the SMS data with one or more content filters further comprises determining whether one or more keywords in the one or more SMS messages is listed on a blacklist of identified spam keywords.

4. The method of claim 1, wherein the filtering the SMS data with one or more content filters comprises determining whether the received SMS data contains a recognized organization schema format.

5. The method of claim 1, wherein extracting relevant information from the filtered SMS data comprises extracting information related to one or more key value pairs from the one or more SMS messages.

6. The method of claim 5 wherein extracting information related to one or more key value pairs comprises extracting a coupon.

7. The method of claim 5, wherein extracting information related to one or more key value pairs comprises extracting a monetary value associated with a transaction.

8. The method of claim 5, wherein extracting information related to one or more key value pairs comprises extracting a temporal value associated with at least one of: a bill, a travel plan and a coupon.

9. The method of claim 5, wherein receiving an indication to provide feedback related to the received SMS data comprises determining that a time associated with the extracted information related to the one or more key value pairs is within a temporal threshold of occurring.

10. The method of claim 5, wherein receiving an indication to provide feedback related to the received SMS data comprises determining that a client device is within a distance threshold from a location associated with the extracted information related to the one or more key value pairs.

11. The method of claim 1, wherein the one or more contextual categories in the tiered contextual content hierarchy include: a financial category, a travel category, a dining category, a retail category and an event category.

12. The method of claim 11, wherein the associated metadata comprises an indication of which of the one or more contextual categories the extracted information has been categorized in.

13. The method of claim 1, wherein the indication to provide feedback related to the received SMS data comprises a reactive indication received in response to user input.

14. The method of claim 1, wherein the indication to provide feedback related to the received SMS data comprises a proactive indication from indicators received from the client.

15. The method of claim 13, wherein natural language processing is used to determine which of the one or more contextual categories the extracted information has been categorized in.

16. A computer-readable storage device comprising executable instructions that, when executed by a processor, assist with providing contextualized SMS data from one or more SMS messages to a client, the computer-readable medium including instructions executable by the processor for:
   receiving SMS data from a client at a server, the SMS data previously being received at the client;
   filtering the SMS data with one or more content filters;

extracting relevant information from the filtered SMS data;

categorizing the extracted information into one or more contextual categories in a tiered contextual content hierarchy, the categorizing comprising analyzing world knowledge related to the extracted information;

associating searchable context metadata with the categorized information;

receiving a request to provide feedback related to the previously received SMS data from the client, the request to provide feedback including a user request related to the previously received SMS data from the client; and providing, based on the associated context metadata, feedback related to the received SMS data to the client.

17. The computer-readable storage device of claim 16, wherein the instructions are further executable by the processor for determining whether the received SMS data contains a recognized organization schema format.

18. The computer-readable storage device of claim 16, wherein the instructions are further executable by the processor for extracting information related to one or more key value pairs from the one or more SMS messages.

19. A system for providing contextualized SMS data from one or more SMS messages to a client, comprising:

a memory for storing executable program code; and a processor, functionally coupled to the memory, the processor being responsive to computer-executable instructions contained in the program code and operative to:

receive SMS data from a client at a server, the SMS data previously being received at the client;

filter the SMS data with one or more content filters;

extract relevant information from the filtered SMS data;

categorize the extracted information into one or more contextual categories in a tiered contextual content hierarchy, the categorizing comprising analyzing world knowledge related to the extracted information;

associate searchable context metadata with the categorized information;

receive a request to provide feedback related to the previously received SMS data from the client, the request to provide feedback including a user request related to the previously received SMS data from the client; and provide, based on the associated context metadata, feedback related to the received SMS data to the client.

20. The system of claim 19, wherein receiving the indication to provide feedback related to the received SMS data comprises determining that a client device is within a distance threshold from a location associated with extracted information related to one or more key value pairs.

* * * * *